US012602571B2

(12) United States Patent
Li et al.

(10) Patent No.: US 12,602,571 B2
(45) Date of Patent: Apr. 14, 2026

(54) NETWORK PARTITIONING FOR SENSOR-BASED SYSTEMS

(71) Applicant: Meta Platforms Technologies, LLC, Menlo Park, CA (US)

(72) Inventors: Ziyun Li, Bellevue, WA (US); Xin Dong, Quincy, MA (US); Barbara De Salvo, Belmont, CA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 848 days.

(21) Appl. No.: 17/819,047

(22) Filed: Aug. 11, 2022

(65) Prior Publication Data

US 2023/0153576 A1 May 18, 2023

Related U.S. Application Data

(60) Provisional application No. 63/278,542, filed on Nov. 12, 2021.

(51) Int. Cl.
| | |
|---|---|
| *G06N 3/09* | (2023.01) |
| *G06N 3/045* | (2023.01) |
| *G06N 3/08* | (2023.01) |

(52) U.S. Cl.
CPC ............... *G06N 3/045* (2023.01); *G06N 3/08* (2013.01)

(58) Field of Classification Search
CPC .. G06F 16/785; G06F 16/7854; G06F 16/786; G06F 16/7867; G06F 18/254;
(Continued)

(56) References Cited

U.S. PATENT DOCUMENTS

| | | | |
|---|---|---|---|
| 2021/0004589 A1* | 1/2021 | Turkelson | G06V 10/82 |
| 2022/0086463 A1* | 3/2022 | Coban | G06N 3/04 |

(Continued)

OTHER PUBLICATIONS

Dong X., et al., "SplitNets: Designing Neural Architectures for Efficient Distributed Computing on Head-Mounted Systems," Proceedings of the IEEE/CVF Conference on Computer Vision and Pattern Recognition (CVPR), 2022, pp. 12559-12569.
(Continued)

*Primary Examiner* — Shyue Jiunn Hwa
(74) *Attorney, Agent, or Firm* — Freestone Intellectual Property Law PLLC; Aaron J. Visbeek

(57) ABSTRACT

Methods, systems, and media for partitioning neural networks are provided. In some embodiments, a method comprises obtaining a training set. The method comprises training a plurality of neural networks using the training set, wherein neural networks differ based on dimensions of one or more layers of the neural networks and a location of a compression block positioned between a first set of layers of a neural network and a second set of layers of the neural network. The method comprises selecting a neural network based on hardware constraints of a system on which the neural network is to be implemented, wherein the first set of layers of the selected neural network are executed by one or more sensor devices of the system, and wherein the second set of layers of the selected neural network are executed by an aggregator computing device of the system.

20 Claims, 10 Drawing Sheets

100

(58) Field of Classification Search

CPC .......... G06F 3/013; G06F 3/017; G06F 3/041; G06F 3/0488; G06V 10/82; G06V 10/44; G06T 2207/20084; G06T 5/00; G06T 5/20; G06T 5/60; G06T 5/73; G06T 7/11; G06T 7/13; G06T 9/002; H04N 1/00; H04N 3/00; H04N 5/00; H04N 7/00; H04N 9/00; G06N 3/0418; G06N 3/044; G06N 3/0442; G06N 3/045; G06N 3/0464; G06N 3/084; G06N 3/09

See application file for complete search history.

(56) References Cited

U.S. PATENT DOCUMENTS

| | | | | |
|---|---|---|---|---|
| 2024/0233313 A1* | 7/2024 | Duan | ......................... | G06T 7/11 |
| 2024/0257374 A1* | 8/2024 | Shi | ............................ | G06T 7/73 |

OTHER PUBLICATIONS

Eshratifar A. E., et al., "BottleNet: A Deep Learning Architecture for Intelligent Mobile Cloud Computing Services," 2019 IEEE/ACM International Symposium on Low Power Electronics and Design (ISLPED), Jul. 29, 2019, 6 pages.

International Search Report and Written Opinion for International Application No. PCT/US2022/049603, mailed Feb. 13, 2023, 9 pages.

Matsubara Y., et al., "Head Network Distillation: Splitting Distilled Deep Neural Networks for Resource-Constrained Edge Computing Systems," IEEE Access, vol. 8, Nov. 20, 2020, pp. 212177-212193.

Pinkham R., et al., "Near-Sensor Distributed DNN Processing for Augmented and Virtual Reality," IEEE Journal on Emerging and Selected Topics in Circuits and Systems, vol. 11, No. 4, Oct. 18, 2021, pp. 663-676.

* cited by examiner

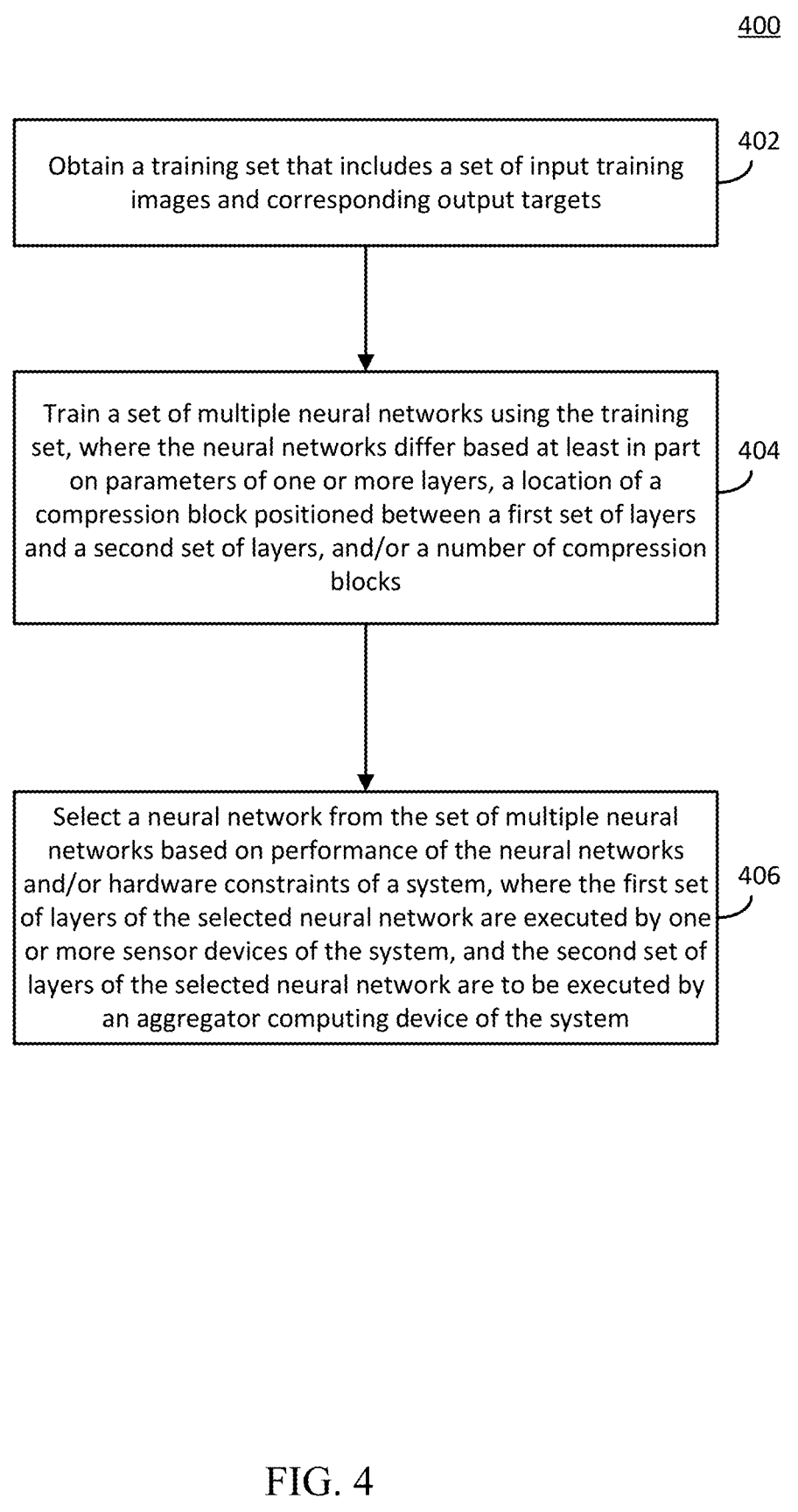

400

┌─────────────────────────────────────────────┐
│  Obtain a training set that includes a set of input training   │  402
│  images and corresponding output targets      │
└─────────────────────────────────────────────┘

│
▼

┌─────────────────────────────────────────────┐
│  Train a set of multiple neural networks using the training    │
│  set, where the neural networks differ based at least in part  │  404
│  on parameters of one or more layers, a location of a         │
│  compression block positioned between a first set of layers   │
│  and a second set of layers, and/or a number of compression   │
│  blocks                                        │
└─────────────────────────────────────────────┘

│
▼

┌─────────────────────────────────────────────┐
│  Select a neural network from the set of multiple neural      │
│  networks based on performance of the neural networks         │
│  and/or hardware constraints of a system, where the first set  │  406
│  of layers of the selected neural network are executed by one  │
│  or more sensor devices of the system, and the second set of   │
│  layers of the selected neural network are to be executed by   │
│  an aggregator computing device of the system                 │
└─────────────────────────────────────────────┘

FIG. 4

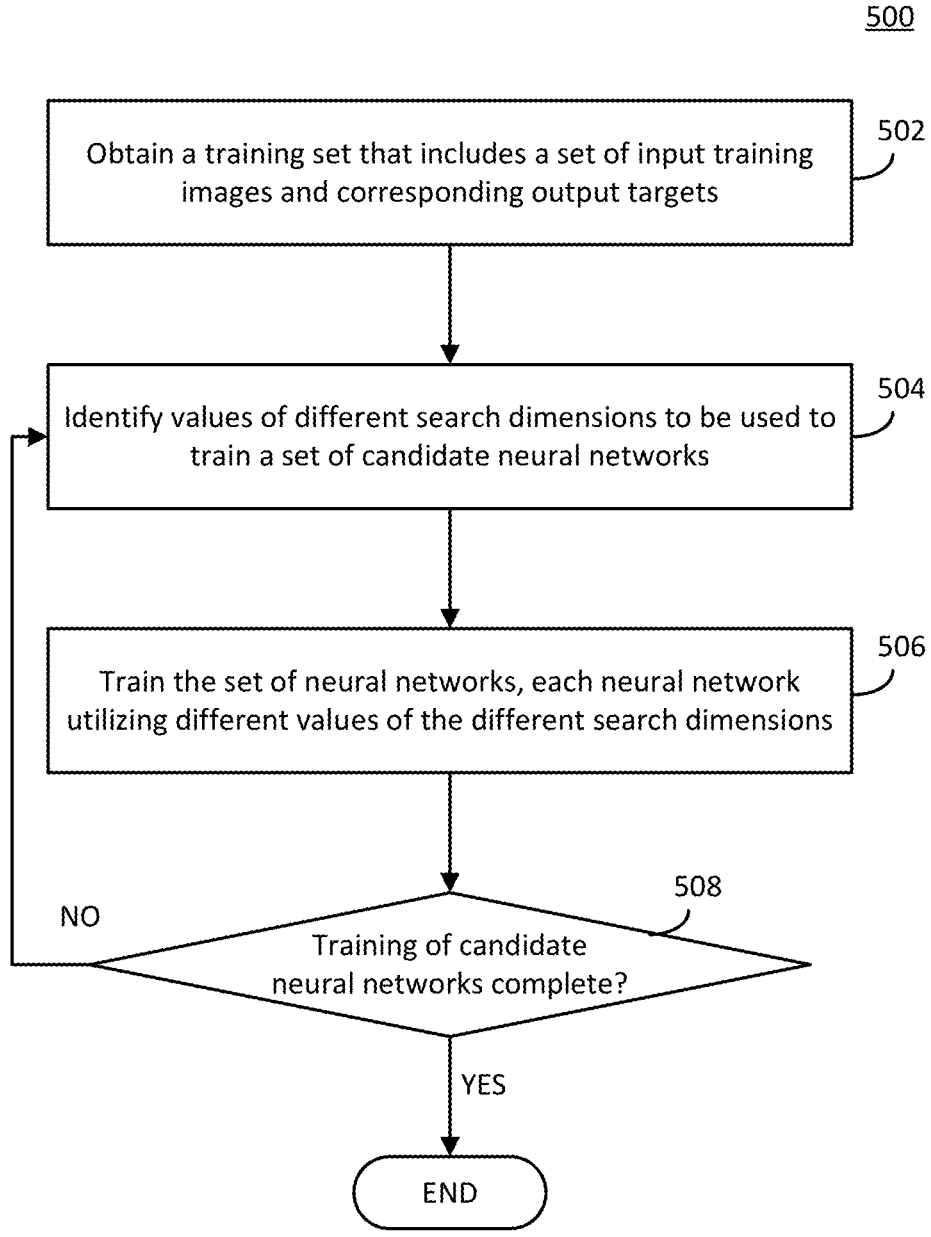

500

502 — Obtain a training set that includes a set of input training images and corresponding output targets 504 — Identify values of different search dimensions to be used to train a set of candidate neural networks 506 — Train the set of neural networks, each neural network utilizing different values of the different search dimensions 508 — Training of candidate neural networks complete?

NO

YES

END

FIG. 5

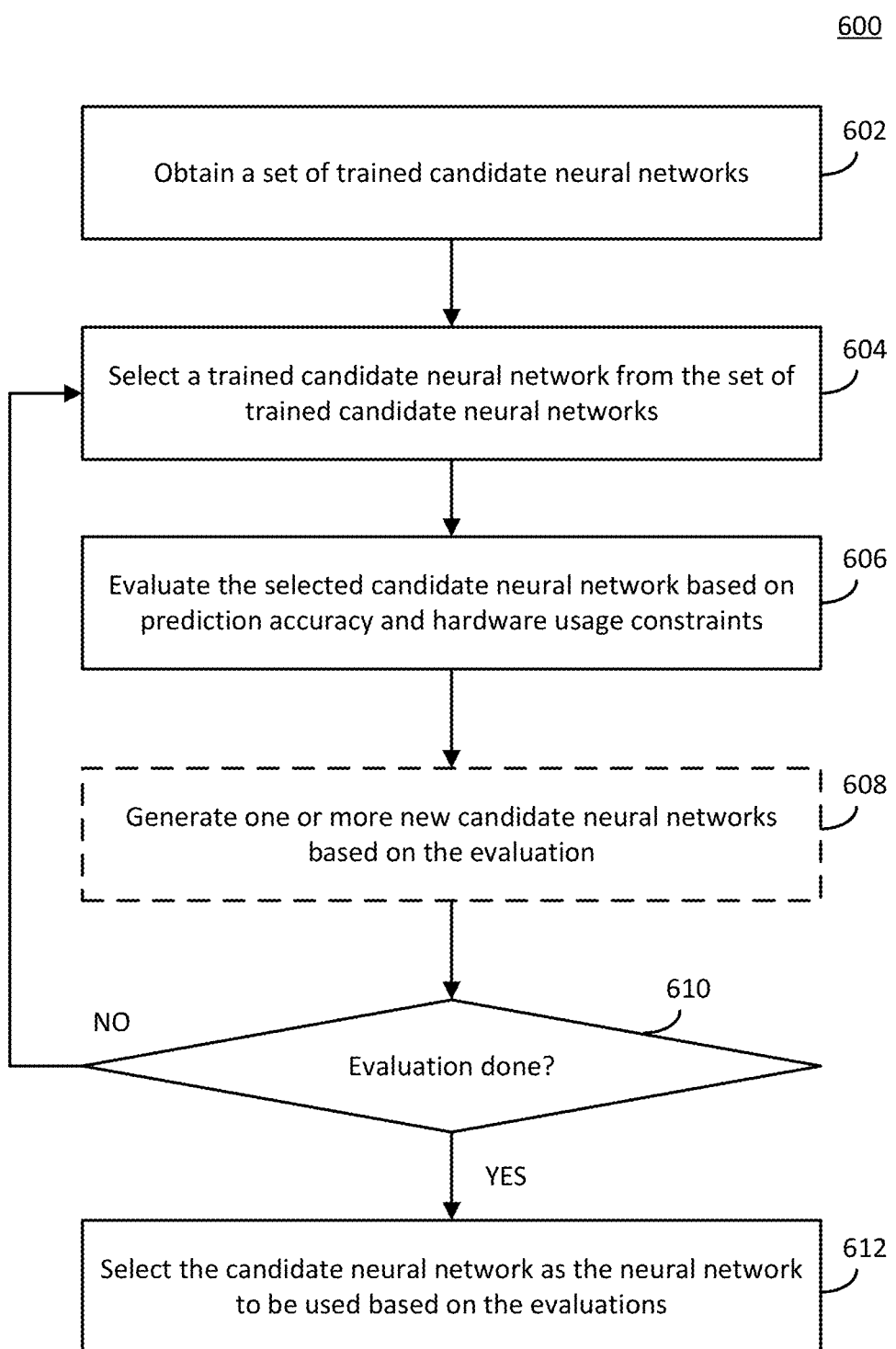

600

602
Obtain a set of trained candidate neural networks

604
Select a trained candidate neural network from the set of trained candidate neural networks 606
Evaluate the selected candidate neural network based on prediction accuracy and hardware usage constraints 608
Generate one or more new candidate neural networks based on the evaluation 610
Evaluation done?

NO

YES

612
Select the candidate neural network as the neural network to be used based on the evaluations

FIG. 6

NETWORK PARTITIONING FOR SENSOR-BASED SYSTEMS

CROSS-REFERENCE TO RELATED APPLICATIONS

This application claims priority under 35 U.S.C. § 119 to U.S. Provisional Application 63/278,542, filed on Nov. 12, 2021, the contents of which are hereby incorporated by reference in their entirety for all purposes.

BACKGROUND

Virtual reality (VR) and augmented reality (AR) systems may utilize multiple sensors (e.g., cameras, or the like), where the output of the multiple sensors may be utilized to make various determinations. For example, image data from multiple cameras on a headset device may be combined to determine a hand location of a hand of a wearer of the headset device. Such determinations are computationally complex and require substantial computational resources, particularly when multiple sensors are used and determinations must be made in real-time or near real-time. In some cases, the sensor data may be provided to complex neural networks, for example, comprising many (e.g., tens to hundreds) of layers. Utilizing such complex networks is computationally intensive.

SUMMARY

Methods, systems, and media for partitioning neural networks are provided. In some embodiments, a method may involve obtaining a training set, wherein the training set comprises a set of input training images and corresponding target outputs. The method may involve training a plurality of neural networks, each neural network of the plurality of neural networks trained using the training set, and wherein neural networks of the plurality of neural networks differ based at least in part on dimensions of one or more layers of the neural networks and a location of a compression block positioned between a first set of layers of a neural network and a second set of layers of the neural network. The method may involve selecting a neural network of the plurality of trained neural networks based on performance of the plurality of neural networks with respect to the training set and hardware constraints of a system on which the neural network is to be implemented, wherein the first set of layers of the selected neural network are executed by one or more sensor devices of the system, and wherein the second set of layers of the selected neural network are executed by an aggregator computing device of the system.

In some examples, training the plurality of neural networks comprises, for each iteration of a series of iterations, training a second plurality of neural networks, wherein the second plurality of neural networks comprise: at least one neural network with all potential parameters of a plurality of potential parameters included, at least one neural network with no compression block, at least one neural network with multiple compression blocks, and at least one neural network with a random sampling of the potential parameters. In some examples, the at least one neural network with all potential parameters of the plurality of potential parameters included comprises at least one neural network with no compression blocks. In some examples, the at least one neural network with all potential parameters of the plurality of potential parameters included comprises at least one neural network with multiple compression blocks. In some examples, the at least one neural network with multiple compression blocks comprises a subset of the potential parameters.

In some examples, the one or more sensor devices comprise a plurality of sensor devices, and wherein the selected neural network comprises: a set of head models, each head model of the set of head models configured to take, as input, sensor data from a sensor of the plurality of sensor devices; and a tail model configured to generate a final output, wherein the tail model corresponds to the second set of layers, wherein the compression block comprises a fusion block configured to aggregate outputs of the set of head models and provide the aggregated outputs to the tail model. In some examples, the selected neural network is selected based at least in part on a location of the fusion block.

In some examples, selecting the neural network comprises: (a) randomly sampling the plurality of trained neural networks to identify a subset of the plurality of trained neural networks; (b) evaluating the subset of the plurality of trained neural networks based on the performance of the subset of the plurality of trained neural networks and the hardware constraints of the system; (c) generating a second plurality of neural networks based at least in part on the evaluation of the subset of the plurality of trained neural networks; and (d) repeating (a)-(c) until the neural network has been identified. In some examples, the second plurality of neural networks comprises a portion of the subset of the plurality of trained neural networks selected based on the evaluation of the subset of the plurality of trained neural networks. In some examples, the second plurality of neural networks comprises at least one neural network of the plurality of trained neural networks not included in the subset of the plurality of trained neural networks. In some examples, the random sampling in (a) comprises a random sampling of a first generation of the plurality of trained neural networks to identify the subset of the plurality of neural networks, and wherein (c) generating the second plurality of neural networks comprises generating the second plurality of neural networks using random sampling, mutation, and crossover from top-performers of the randomly sampled first generation of the plurality of trained neural networks identified in the evaluation in (b).

In some examples, the hardware constraints of the system comprise a communication latency to transmit feature information generated from the first set of layers on the one or more sensor devices to the second set of layers on the aggregator computing device.

In some examples, the hardware constraints of the system comprise memory usage, bandwidth, or any combination thereof.

In some examples, at least one neural network of the plurality of neural networks comprises at least 100 layers.

In some examples, the compression block comprises a compression that reduces feature dimensions generated by the first set of layers and an expansion that increases the feature dimensions prior to providing features to the second set of layers.

In some embodiments, a system comprises a sensor associated with a sensor computing device and an aggregator computing device. In some embodiments, the sensor computing device is configured to implement a first set of layers of a neural network, and wherein the aggregator computing device is configured to implement a second set of layers of a neural network, and wherein there is a compression block between the first set of layers and the second set of layers that reduces a feature dimension size of a feature set generated by the first set of layers prior to providing the feature set to the second set of layers. In some embodiments, the neural network was selected from a plurality of neural networks based at least in part on an effect of a location of the compression block with respect to the first set of layers and the second set of layers on hardware usage of the sensor computing device and the aggregator computing device.

In some examples, the sensor comprises a camera.

In some examples, the system comprises a plurality of sensors including the sensor, each associated with a sensor computing device, and wherein the compression block occurs subsequent to a fusion layer that combines feature sets associated with each sensor of the plurality of sensors.

In some examples, the hardware usage comprises a communication latency to transmit the feature set from the sensor computing device to the aggregator computing device.

In some examples, the hardware usage comprises memory usage, bandwidth, or any combination thereof of the sensor computing device and/or the aggregator computing device.

BRIEF DESCRIPTION OF THE DRAWINGS

FIG. 4 is a flowchart of an example process for training and selecting a partitioned neural network according to certain embodiments.

FIG. 5 is a flowchart of an example process for training candidate neural networks according to certain embodiments.

FIG. 6 is a flowchart of an example process for selecting a candidate neural network according to certain embodiments.

DETAILED DESCRIPTION

Figure 1:
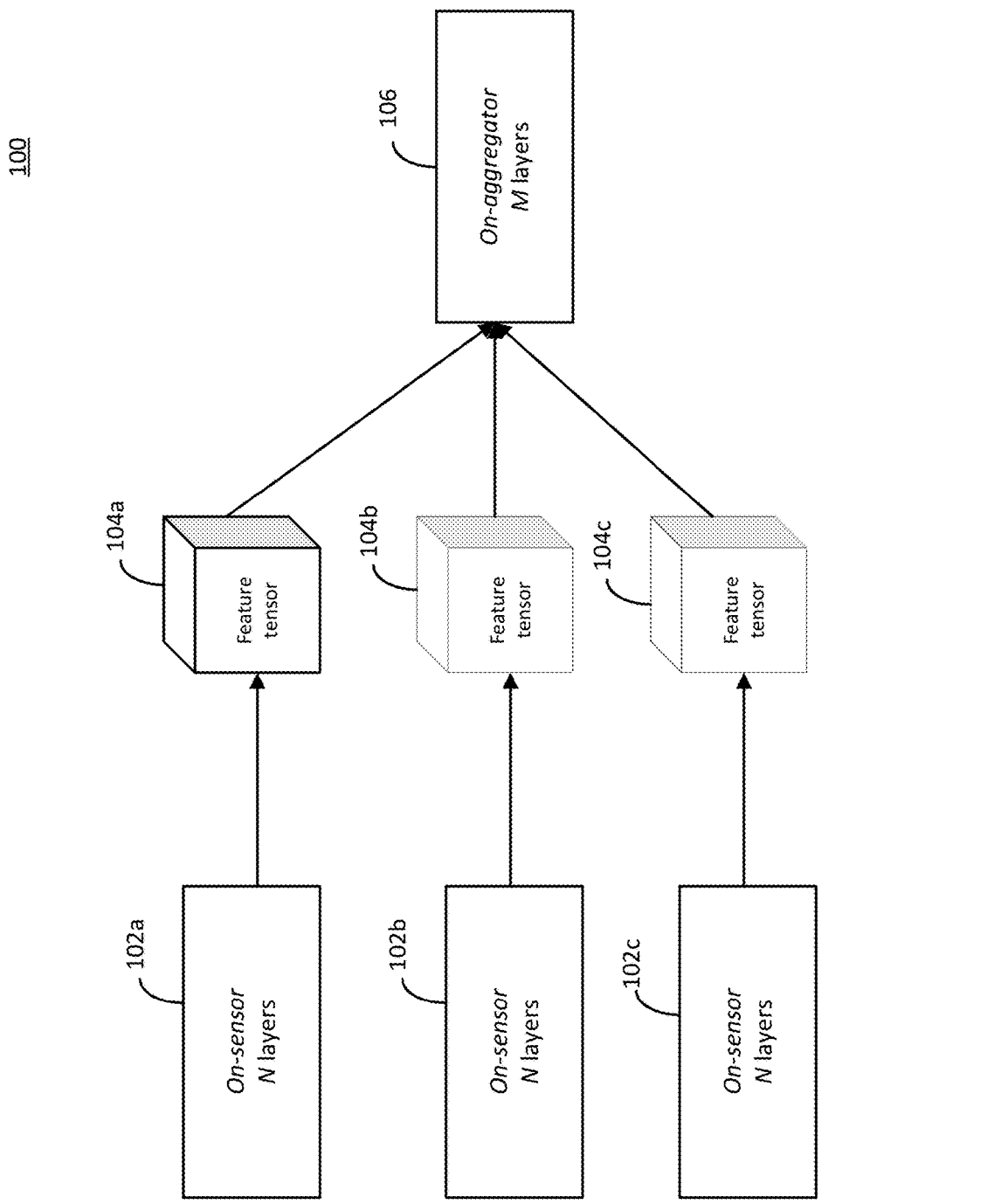
FIG. 1 is schematic diagram that illustrates partitioning of a model between on-sensor computing devices and an aggregator computing device according to certain embodiments.

Virtual reality (VR) and augmented reality (AR) systems may utilize multiple sensors (e.g., cameras, or the like), where the output of the multiple sensors may be utilized to make various determinations. For example, image data from multiple cameras on a headset device may be combined to determine a hand location of a hand of a wearer of the headset device. Such determinations are computationally complex and require substantial computational resources, particularly when multiple sensors are used and determinations must be made in real-time or near real-time. In some cases, the sensor data may be provided to complex neural networks, for example, comprising many (e.g., tens to hundreds) of layers. Utilizing such complex networks is computationally intensive.

Neural network implementation may typically take place using an aggregator computing device, where data is transmitted from sensor computing devices to the aggregator computing device for processing. With multiple sensors (e.g., 4, 8, 12, 16, etc.) on a single headset, the bandwidth and latency required to transmit data from the sensors to the aggregator computing device may not be suitable for real-time or near real-time applications. With improved sensor design, many on-device sensors are themselves associated with computing devices with computing ability suitable for neural network implementation. It may be advantageous to implement a portion of a neural network on sensor computing devices (e.g., to take advantage of the computing ability of the sensor computing devices and to decrease bandwidth and latency required to transmit data to the aggregator computing device) and to implement a portion of the neural network on the aggregator computing device (e.g., to generate a final output). However, determining which portions of a neural network to implement on sensor computing devices and which portions of the neural network to implement on the aggregator computing device may involve various tradeoffs. For example, an optimal splitting of the neural network between the sensor computing devices and the aggregator computing device may depend on the task (e.g., hand location recognition, body orientation determination, etc.), the number of sensor devices, hardware constraints of the sensor computing devices and/or the aggregator computing device, etc.

Conventional techniques have typically involved constructing a neural network with a fixed number of layers (e.g., m layers) and using a brute-force technique to identify a splitting point such that n layers are implemented by the sensor computing devices and m-n layers are implemented by the aggregator computing device. However, such a brute-force technique may not find an ideal solution, because various characteristics of the neural network, such as the number of layers and/or sizes of the layers are fixed, and therefore, are not optimized based on the splitting point.

Disclosed herein are various systems, methods, and techniques for identifying a neural network architecture, where a portion of the neural network is implemented by sensor computing devices, and a remaining portion of the neural network is implemented by an aggregator computing device. In some embodiments, the neural network architecture is identified by constructing a set of candidate neural networks, which may number in the hundreds or thousands. It should be noted that construction and training of the candidate neural networks is generally referred to as the first stage of the technique for identifying the neural network architecture. The candidate neural networks may be trained using a training set to perform a particular task, such as hand location recognition, or other suitable task. The candidate neural networks may differ from each other in architecture characteristics, such as layer size, number of layers, etc. Additionally, the candidate neural networks may differ in location of compression blocks, where the compression block represents a reduction in feature size of a feature set generated by a first set of layers of a neural network, prior to providing the feature set to a second set of layers, where the first set of layers are to be implemented by one or more sensor computing devices, and the second set of layers are to be implemented by an aggregator computing device.

In some implementations, training the candidate neural networks may comprise a series of training iterations, where, in each training iteration, multiple candidate neural networks are trained jointly. In each iteration, architectures of the multiple candidate neural networks may be identified to optimally identify the architecture to be used. For example, in some implementations, the multiple candidate neural networks may include the best Pareto architecture (e.g., to give an upper bound on accuracy) and the worst Pareto architecture (e.g., to give a lower bound on accuracy). In some implementations, given a set of parameters that may be included in a neural network (e.g., parameters A, B, C, etc.) and a set of M potential compression blocks that may be included between layers of a neural network, the multiple candidate neural networks may include:

1. A network with all potential parameters of a plurality (or set) of potential parameters and no compression blocks. This network may correspond to the largest potential network, and may be considered the best Pareto architecture. In other words, this network may include every parameter of a set of multiple potential parameters. Because a compression block may serve to reduce a parameter space, inclusion of every potential parameter of a set of potential parameters without inclusion of any compression blocks may correspond to the largest potential network.

2. A network with all potential parameters of the plurality (or the set) of potential parameters and all compression blocks. Training this network in an iteration may ensure that all parameters may be updated during the training iteration.

3. A network with a subset of the set of potential parameters and all compression blocks. This network may correspond to the smallest potential network, and may be considered the worst Pareto architecture.

4. A network comprising a random sampling of the potential parameters and one compression block. Because the selected (e.g., deployed) neural network will have one compression block corresponding to a transition point between on-sensor computation and aggregator device computing, this network may correspond to an actually deployed neural network.

After generating the set of candidate neural networks based on task performance, a neural network from the set of candidate neural networks may be selected. Selection of the neural network from the set of candidate neural networks is generally referred to herein as the second stage of the technique for selecting the neural network architecture. In some embodiments, the neural network may be selected based on any combination of criteria including task performance and hardware constraints. In some embodiments, hardware constraints may include communication latency to transmit a feature set from the sensor computing devices to the aggregator computing device, communication bandwidth, memory usage, or any combination thereof. In some implementations, the neural network may be selected by sampling the set of candidate neural networks to generate a subset of the candidate neural networks, and evaluating the sampled subset. Continuing with this example, in some implementations, characteristics of higher-performing neural networks of the sampled subset may be combined to generate new neural network architectures that may then be evaluated, in other words, utilizing an evolutionary search or genetic algorithm to identify the neural network architecture to be used.

It should be noted that, in instances in which multiple sensor devices (e.g., multiple cameras) are utilized, a selected neural network may have a set of head nodes, each head node corresponding to a sensor device of the multiple sensor devices, where each head node comprises a set of layers that process sensor data from the corresponding sensor device. The selected neural network may additionally have a tail node that comprises a set of layers that generate a final predicted output. The selected neural network may have a fusion block that aggregates outputs from the set of head nodes and provides the aggregated output to the tail node. In some implementations, the set of candidate neural networks may include neural networks in which the fusion block is positioned at different locations (e.g., with different numbers of layers associated with head nodes of the set of head nodes relative to associated with the tail node, or the like). In some implementations, selection of the neural network may be based on location of the fusion block, such that the selected neural network has the fusion block at a location that optimizes accuracy and/or hardware constraints.

By generating a set of candidate neural networks and selecting a particular neural network to be used, an optimal neural network, optimized based on task and hardware constraints, may be constructed.

FIG. 1 is a diagram of an example system that utilizes a partitioned neural network in accordance with some embodiments. As illustrates, on-sensor computing devices $102a$, $102b$, and $102c$ may implement the first N layers of a neural network having K layers. Each on-sensor computing device may generate, as an output of the first N layers, a corresponding feature tensor. For example, on-sensor computing device $102a$ generates a feature tensor $104a$, on-sensor computing device $102b$ generates a feature tensor $104b$, and on-sensor computing device $102c$ generates a feature tensor $104c$. Each feature tensor may be passed to an on-aggregator computing device $106$. The feature tensors may be combined, and provided as an input to the final M layers of the neural network to generate a final prediction, or output. Note that the N layers implemented by the one or more on-sensor computing devices plus the M layers implemented by the on-aggregator computing device may sum to the K total layers of the neural network. Additionally, it should be noted that although three on-sensor computing devices (e.g., $102a$, $102b$, and $102c$) are depicted in FIG. 1, in some embodiments, any suitable number of on-sensor computing devices (e.g., 1, 2, 5, 10, 20, etc.) may be utilized.

Disclosed herein are techniques for determining a splitting, or partition point that divides a neural network (e.g., a deep neural network) such that N layers are executed on-sensor, and the remaining M layers are executed on-aggregator. As used herein, the "head" part of the network includes the N layers prior to the splitting point, and is generally referred to herein as $f_{sen}$. The "tail" part of the network includes the M layers after the splitting point, and is generally referred to herein as $f_{agg}$. The head portion of the network (generates a feature vector or a feature tensor (generally represented herein by "z"), which is uploaded or transmitted to the tail portion of the network. In the techniques disclosed herein, the optimal partitioning point is determined subject to hardware considerations. For example, the optimal partitioning point may be determined in a manner than minimizes computation latency (generally represented herein as "T") subject to a loss function and/or peak memory consumption (e.g., of the on-sensor computing devices, or the like). By way of example, optimal partitioning may be represented by:

$$\min_{f_{sen}, f_{agg}} T_{sen}(f_{sen}, x) + T_{comm}(z) + T_{agg}(f_{agg}, z)$$

$$\text{such that: } L\left(f_{agg}^{\circ}, f_{sen}: D^{val}\right) \leq A \text{ and } PeakMem(f_{sen}, x) \leq B$$

In the equations given above, $z=f_{sen}(x)$, T represents the latency measurement, L represents a loss function (e.g., cross entropy), and PeakMem represents the peak memory consumption of the head part of the neural network. Because the on-sensor portion of the network, $f_{sen}$, and the on-aggregator portion of the network, $f_{agg}$, are correlated, the on-sensor portion and the on-aggregator portion cannot be searched separately. In the techniques described herein, the entire model is searched to identify the optimal partitioning point.

In some implementations, a compression block may be inserted between the on-sensor portion of the network and the on-aggregator portion of the network. The compression block may serve to reduce a channel size of the feature vector or the feature tensor z to be transmitted from the one or more on-sensor computing devices to the on-aggregator computing device, thereby reducing communication cost. In some embodiments, a compression block may utilize a convolution layer than reduces a number of input channels c associated with the feature tensor z generated by the on-sensor portion of the neural network by a compression ratio m. For example, c input channels may be reduced to c/m channels when transmitted to the on-aggregator computing device. Example values of m are 4, 6, 8, 12, 16, 20, or the like.

During training, the location of the compression block may be varied in order to identify an optimal location. For example, to train a particular candidate neural network, after every layer of the on-sensor portion of the neural network, a decision may be made of whether to include a compression block or not. As described above, insertion of a compression block reduces the channel size by a factor of m. Because varying the input channel size between different candidate neural networks may cause large training instabilities, a compression block may additionally include an expansion block that, when implemented on the on-aggregator computing device, expands the channel size from c/m to c, thereby providing training stability.

Figure 2:
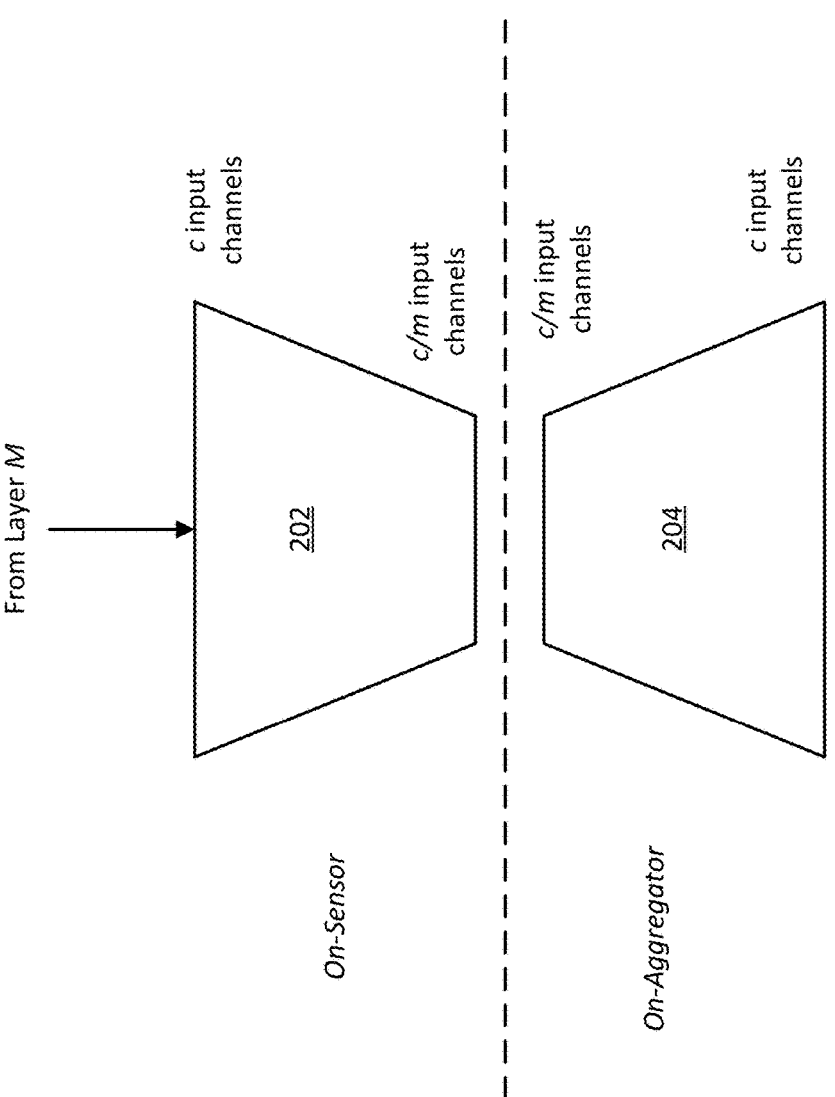
FIG. 2 is a diagram of a compression module that may be used to compress feature tensors according to certain embodiments.

FIG. 2 is a schematic diagram of an example compression block that may be utilized in connection with a partitioning point between an on-sensor portion of a network and an on-aggregator portion of the network in accordance with some embodiments. As illustrated, the compression block may include a first portion 202, executed on the on-sensor computing device, which reduces an input channel size from c to c/m. The compression block may additionally include a second portion 204, executed on the on-aggregator computing device, which expands the feature tensor size from c/m to c.

Figure 3A:
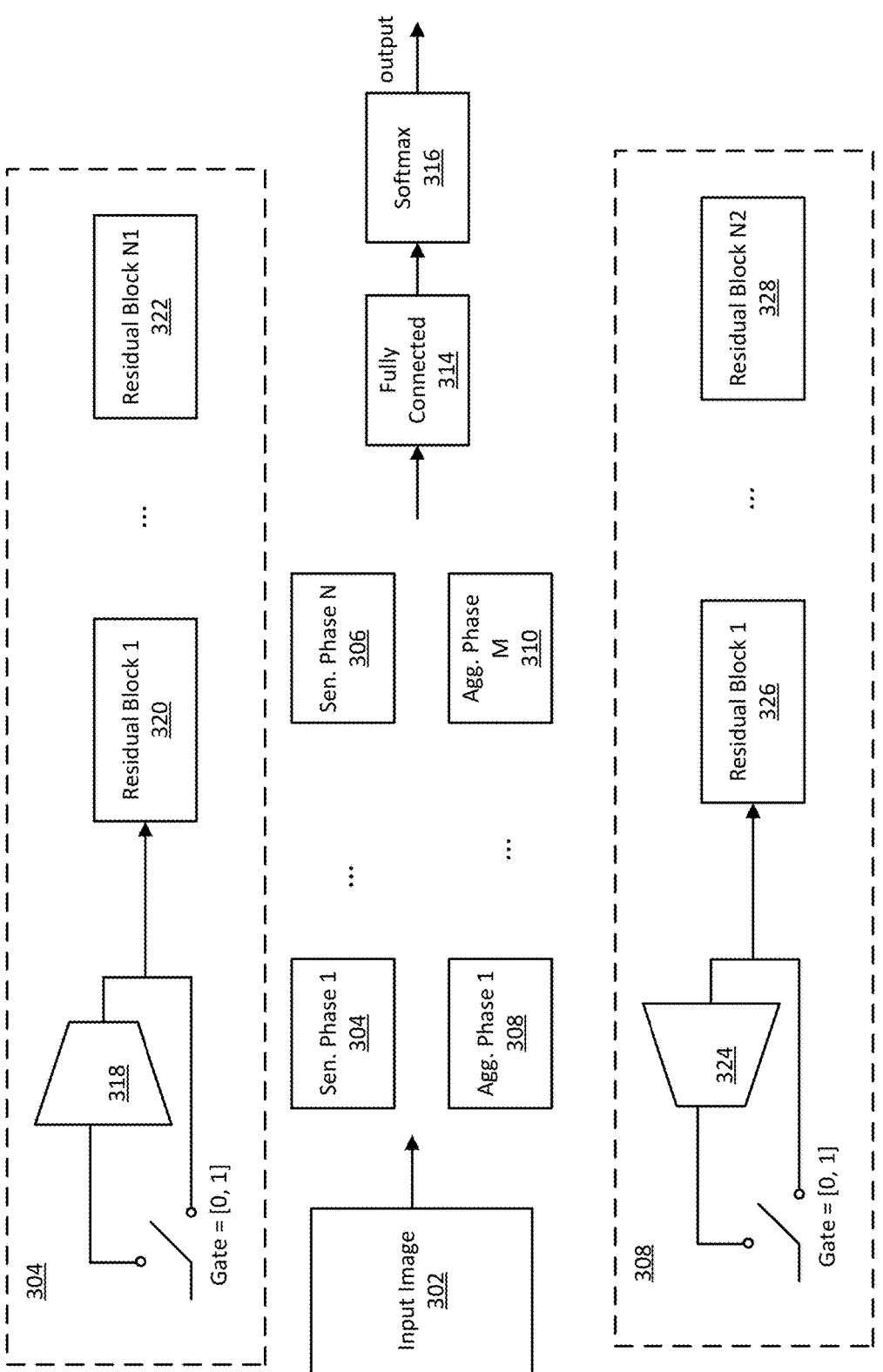
FIG. 3A illustrates example blocks of an on-sensor portion of a neural network and an on-aggregator portion of the neural network according to certain embodiments.

FIG. 3A illustrates on-sensor and on-aggregator portions of an example neural network according to certain embodiments. As illustrated, an input image 302 may be provided to an on-sensor portion of a neural network. Note that, in some implementations, the input resolution of input image 302 may be a parameter that is varied during training of the candidate neural networks, as will be described below in connection with FIGS. 4 and 5. The on-sensor portion of the neural network may have N phases or blocks, such as on-sensor phase 304 and on-sensor phase 306. The output of the N-th on-sensor phase may be provided to the first on-aggregator phase or block of the neural network. There may be M on-aggregator phases or blocks, as illustrated in FIG. 3A, such as on-aggregator phase 308 and on-aggregator phase 310. The output of the M-th on-aggregator block may be provided to fully-connected layer 314. The output of fully-connected layer 314 may then be provided to a softmax function 316, which may be configured to generate a final output or prediction.

A given on-sensor phase or block may include an optional compressive portion of a compression block, such as compressive portion 318. Alternatively, the on-sensor phase or block may omit compressive portion 318. Whether or not compressive portion 318 is included in the on-sensor phase or block may be controlled by a gating variable that may be randomly selected. For example, compressive portion 318 may be included responsive to the gating variable being 1, and omitted responsive to the gating variable being 0. Note that, in some implementations, the compressive factor of the compressive portion may be a parameter that may be varied during training of the candidate neural networks, as will be described in more detail below in connection with FIGS. 4 and 5. The on-sensor phase or block may additionally include $N_1$ residual blocks, such as residual block 320 and residual block 322. Note that the value of $N_1$ may be dynamically selected during training of the candidate neural networks, as will be described below in more detail in connection with FIGS. 4 and 5. Each residual block may have a particular stride. Example stride values include 1, 2, 4, 8, etc.

A given on-aggregator phase or block may include an optional expansive portion of a compression block, such as expansive portion 324. Alternatively, the on-aggregator phase or block may omit expansive portion 318. Whether or not expansive portion 324 is included in the on-aggregator phase or block may be determined based on whether or not a compressive portion is included in the corresponding on-sensor phase or block. For example, in an instance in which a compressive portion is selected in on-sensor phase or block 1, a corresponding expansive portion is included in on-aggregator phase or block 1. Note that, in some implementations, the expansion factor of an expansive portion may be set to match the compression factor of the corresponding compressive portion in the corresponding on-sensor phase or block. The on-aggregator phase or block may additionally include $N_2$ residual blocks, such as residual block 326 and residual block 328. Note that the value of $N_2$ may be dynamically selected during training of the candidate neural networks, as will be described below in more detail in connection with FIGS. 4 and 4. Each residual block may have a stride, which may be selected to match a stride used in residual blocks of the corresponding on-sensor phase or block.

In some implementations, at each training iteration, multiple candidate neural networks are trained, where each neural network of the candidate neural networks may vary based on one or more parameters (e.g., number of residual blocks for a given on-sensor or on-aggregator phase or block, as shown in and described above in connection with FIG. 3A), the resolution of an input image, compression factor of a compression block, etc. In some implementations, candidate neural networks may differ based on whether, where, and how many compression blocks are included that partition an on-sensor portion of the neural network from an on-aggregator portion of the neural network. As a specific example, in some implementations, four candidate neural networks may be trained in a given iteration. These four candidate neural networks may include:

1. A network with all potential parameters of a plurality (or set) of potential parameters and no compression blocks. This network may correspond to the largest potential network, and may be considered the best Pareto architecture. In other words, this network may include every parameter of a set of multiple potential parameters. Because a compression block may serve to reduce a parameter space, inclusion of every potential parameter of a set of potential parameters without inclusion of any compression blocks may correspond to the largest potential network.

2. A network with all potential parameters of the plurality (or the set) of potential parameters and all compression blocks. Training this network in an iteration may ensure that all parameters may be updated during the training iteration.

3. A network with a subset of the set of potential parameters and all compression blocks. This network may correspond to the smallest potential network, and may be considered the worst Pareto architecture.

4. A network comprising a random sampling of the potential parameters and one compression block. Because the selected (e.g., deployed) neural network will have one compression block corresponding to a transition point between on-sensor computation and aggregator device computing, this network may correspond to an actually deployed neural network.

Figure 3B:
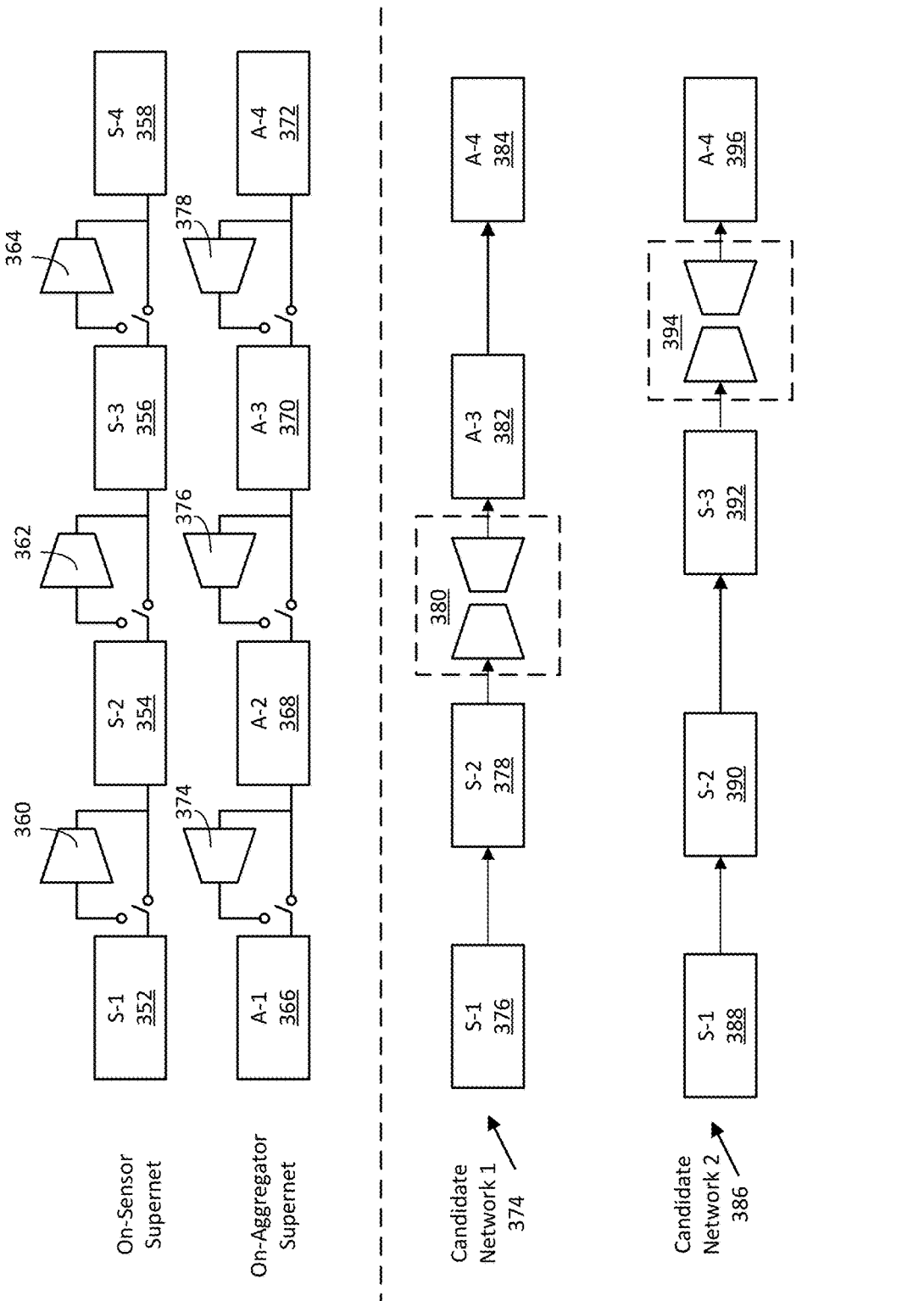
FIG. 3B illustrates two example candidate neural networks according to certain embodiments.

Each of these different candidate neural networks may be constructed and trained by selecting different parameters from an on-sensor supernet and an off-sensor supernet, as shown in and described below in connection with FIG. 3B. For example, an on-sensor supernet may include one or more on-sensor phases or blocks (e.g., 352, 354, 356, and 358). Each on-sensor phase or block may be joined by either a compressive portion of a compression block (e.g., compressive portions 360, 362, and/or 364), or by an identity block which passes through an output of one on-sensor phase or block to the subsequent on-sensor phase or block. Whether the compressive portion or the identity block is selected may be controlled by a gating variable, as described above in connection with FIG. 3A. Similarly, an on-aggregator supernet may include one or more on-aggregator phases or blocks (e.g., 366, 368, 370, and 372). Each on-aggregator phase or block may be joined by either an expansive portion of a compression block (e.g., expansive portions 374, 376, and/or 378), or by an identity block. Note that, if a compressive portion is selected for a given on-sensor phase or block, an expansive portion is also selected for the corresponding on-aggregator phase or block, representing a partitioning between the on-sensor portion of the neural network and an on-aggregator portion of the neural network.

For a given iteration, various candidate neural networks may be trained by selecting a number of on-sensor phases or blocks, a number of on-aggregator phases or blocks, an input image size, or the like. Additionally, as described above, some candidate neural networks may include a compressive portion between every on-sensor phase or block and a corresponding expansive portion between every on-aggregator phase or block (e.g., corresponding to candidate neural networks 2 and 3, as delineated above). Some candidate neural networks may include no compressive portions and no expansive portions (e.g., corresponding to candidate neural network 1, as delineated above). Some candidate neural networks may include exactly one compressive portion and one expansive portion (e.g., corresponding to candidate neural network 4, as delineated above).

Note that, a finally selected neural network may have exactly one compression block that includes one compressive portion followed by one expansive portion. The location of the compression block may be identified as an optimal location (e.g., an optimal location to partition the on-sensor portion of the neural network and the on-aggregator portion of the neural network). For example, various candidate neural networks may include one or more compression blocks in various locations, thereby allowing locations of the compression blocks to be evaluated. For example, candidate neural network 374 includes a first on-sensor block 376, a second on-sensor block 378, a compression block 380, a first on-aggregator block 382, and a second on-aggregator block 384. As another example, candidate neural network 386 includes a first on-sensor block 388, a second on-sensor block 390, a third on-sensor block 392, a compression block 394, and a first on-aggregator block 396.

Figure 3C:
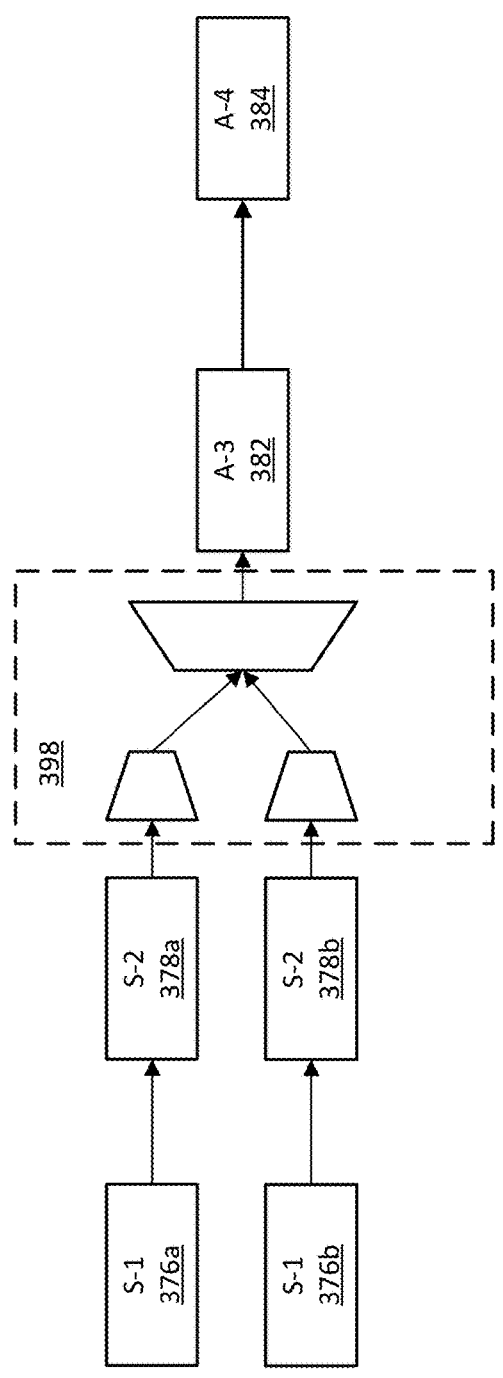
FIG. 3C illustrates an example candidate neural network for a multi-view system according to certain embodiments.

It should be noted that similar techniques may be used to train candidate neural networks for a multi-sensor system (e.g., that utilizes multiple cameras to obtain multiple viewpoints of image data, or the like). In some implementations, the location of the compression block may be varied and/or identified, similar to what is described above and shown in FIG. 3B. However, the output of multiple compressive portions of a compression block (each associated with a sensor of the multi-sensor system) may be concatenated together prior to being provided to an expansive portion of the compression block. For example, referring to the multi-view candidate network shown in FIG. 3C, a first sensor is associated with first on-sensor block 376a and second on-sensor block 378a, while a second sensor is associated with first on-sensor block 376b and second on-sensor block 378b. Compression block 398 includes two compressive portions, the first compressive portion associated with the first sensor and the second compressive portion associated with the second sensor. The outputs of each compressive portion are concatenated, or fused, prior to being provided to the expansive portion of compression block 398, which is then provided to the on-aggregator phases or blocks (e.g., on-aggregator phases or blocks 382 and 384).

In some implementations, a partitioned neural network may be selected by training multiple candidate neural networks and selecting the partitioned neural network from among the multiple candidate neural networks. For example, in some embodiments, each iteration of a series of iterations may train a set of multiple neural networks, where the set of multiple neural networks are configured to provide at least an upper and lower bound on performance of a selected partitioned neural network. For example, as described above in connection with FIGS. 3A-3C, the set of multiple neural networks may include: a network with all potential layers and no compression blocks (e.g., the best Pareto architecture); a network with all potential layers and all compression blocks; a network with a subset of all parameters and all compression blocks (e.g., the worst Pareto architecture); and/or a network comprising a random sampling of all potential parameters and one compression block. After iterative training of the sets of multiple neural networks, a single partitioned network may be selected by evaluating the performance of the multiple trained neural networks with respect to both accuracy (e.g., performance on a training set or a testing set), and based on hardware constraints. FIG. 4 depicts a high-level process for training of the sets of multiple neural networks and selection of the single partitioned neural network in accordance with some embodiments. FIG. 5 illustrates a detailed example process for training of the sets of multiple neural networks. FIG. 6 depicts a detailed example process for selection of the partitioned network based on accuracy and hardware constraints.

FIG. 4 depicts an example process 400 for training sets of multiple neural networks and selecting a partitioned neural network based on accuracy and hardware constraints in accordance with some embodiments. Blocks of process 400 may be executed on by one or more server devices. In some implementations, two or more blocks of process 400 may be executed substantially in parallel. In some implementations, one or more blocks of process 400 may be omitted. In some embodiments, blocks of process 400 may be executed in an order other than what is shown in FIG. 4.

Process 400 can begin at 402 by obtaining a training set that includes a set of input training images and corresponding output targets. It should be noted that each training sample may include one or more training images, where each training image may be associated with a different camera or viewpoint. In some implementations, the output target may be any suitable target, such as classification of the corresponding training image(s) as being associated with a particular object (e.g., a particular body region, such as a hand, a finger, etc.), or the like.

At 404, process 400 can train a set of multiple neural networks using the training set. In some implementations, a group of multiple neural networks may be associated with a particular training iteration. It should be noted that block 404 generally corresponds to the first stage of the technique for selecting a partitioned neural network architecture. For each training iteration, the group of multiple neural networks may be configured to span the space that provides an upper bound and a lower bound on model accuracy (e.g., the best and worst Pareto architectures, respectively). In some implementations, each set of neural networks within an iteration may vary based on parameters associated with one or more layers, a location of a compression block positioned between a first set of the layers and a second set of the layers, and/or a number of compression blocks utilized in the neural network. For example, parameters associated with the one or more layers may include dimensions of the one or more layers, a compression factor associated with each compression block, and/or an input image size or resolution taken by the neural network. In some implementations, for a given training iteration, four candidate neural networks may be trained, which may include:

1. A network with all potential parameters of a plurality (or set) of potential parameters and no compression blocks. This network may correspond to the largest potential network, and may be considered the best Pareto architecture. In other words, this network may include every parameter of a set of multiple potential parameters. Because a compression block may serve to reduce a parameter space, inclusion of every potential parameter of a set of potential parameters without inclusion of any compression blocks may correspond to the largest potential network.

2. A network with all potential parameters of the plurality (or the set) of potential parameters and all compression blocks. Training this network in an iteration may ensure that all parameters may be updated during the training iteration.

3. A network with a subset of the set of potential parameters and all compression blocks. This network may correspond to the smallest potential network, and may be considered the worst Pareto architecture.

4. A network comprising a random sampling of the potential parameters and one compression block.

Because the selected (e.g., deployed) neural network will have one compression block corresponding to a transition point between on-sensor computation and aggregator device computing, this network may correspond to an actually deployed neural network.

Note that more detailed techniques for training the set of multiple neural networks are shown in and described below in connection with FIG. 5.

At 406, process 400 can select a neural network from the set of multiple neural networks based on performance of the neural networks and/or hardware constraints of a system. It should be noted that block 406 generally corresponds to the second stage of the technique to select the partitioned neural network architecture. Note that the selected neural network has a compression block where layers prior to the compression block are to be executed by one or more on-sensor computing devices, and where layers subsequent to the compression block are to be executed by an on-aggregator computing device. In instances in which multiple sensor devices are utilized, the compression block may include multiple compressive portions (each associated with a different on-sensor computing device), and a single expansive portion, as shown in and described above in connection with FIG. 3C. In particular, the neural network may be selected based on hardware constraints of a system on which the selected neural network is to be deployed, where the system includes one or more sensor devices configured to execute a first set of layers of the selected neural network prior to the compression block, and an aggregator device configured to execute a second set of layers of the selected neural network subsequent to the compression block.

In some implementations, the hardware constraints considered in selection of the neural network may include overall latency used to transmit feature tensors from the one or more on-sensor computing devices to the on-aggregator computing device, peak memory usage of on-sensor computing devices, network bandwidth utilized, or any combination thereof.

In some embodiments, selection of the neural network may involve construction of multiple new neural networks which are generated based on an evaluation of candidate neural networks in the set of multiple neural networks. For example, as will be discussed below in more detail in connection with FIG. 6, the multiple new neural networks may constructed that utilize one or more characteristics of candidate neural networks that have been favorably evaluated in order to generate a cross-over neural network that utilizes at least some features of a favorably evaluated neural network.

FIG. 5 illustrates an example process 500 for training sets of candidate neural networks in accordance with some embodiments. It should be noted that process 500 generally corresponds to the first stage for selecting the partitioned neural network architecture. In some implementations, blocks of process 500 may be executed by one or more server devices. In some embodiments, two or more blocks of process 500 may be executed substantially in parallel. In some embodiments, one or more blocks of process 500 may be omitted. In some embodiments, blocks of process 500 may be performed in an order other than what is shown in FIG. 5.

Process 500 can begin at 502 by obtaining a training set that includes a set of input training images and corresponding output targets. It should be noted that each training sample may include one or more training images, where each training image may be associated with a different camera or viewpoint. In some implementations, the output target may be any suitable target, such as classification of the corresponding training image(s) as being associated with a particular object (e.g., a particular body region, such as a hand, a finger, etc.), or the like.

At 504, process 500 can identify values of different search dimensions to be used to train a set of candidate neural networks. The search dimensions may correspond to different values of parameters to be used to construct a set of candidate neural networks in a given training iteration. For example, the search dimensions may include parameters associated with different layers of a candidate neural network, such as dimensions of the different layers. As another example, the search dimensions may include an input image size or resolution taken as input by a given candidate neural network. As yet another example, the search dimensions may include a number of compression blocks to be utilized in a given candidate neural network. As still another example, the search dimensions may include a compression factor associated with a compression block utilized in a given candidate neural network. As still another example, the search dimensions may include a location of a compression block in a given candidate neural network (e.g., where to partition the candidate neural network between the on-sensor portion and the on-aggregator portion).

In some implementations, as described above, values of the different search dimensions may be determined such that the candidate neural networks in the set of candidate neural networks span the space determined by an upper and lower bound of performance.

At 506, process 500 may train the set of neural networks, each neural network utilizing different values of the different search dimensions, which may include different compression block characteristics (e.g., the number and location(s) of the compression blocks). As described above, in some implementations, four candidate neural networks may be trained, which may include:

1. A network with all potential parameters of a plurality (or set) of potential parameters and no compression blocks. This network may correspond to the largest potential network, and may be considered the best Pareto architecture. In other words, this network may include every parameter of a set of multiple potential parameters. Because a compression block may serve to reduce a parameter space, inclusion of every potential parameter of a set of potential parameters without inclusion of any compression blocks may correspond to the largest potential network.

2. A network with all potential parameters of the plurality (or the set) of potential parameters and all compression blocks. Training this network in an iteration may ensure that all parameters may be updated during the training iteration.

3. A network with a subset of the set of potential parameters and all compression blocks. This network may correspond to the smallest potential network, and may be considered the worst Pareto architecture.

4. A network comprising a random sampling of the potential parameters and one compression block. Because the selected (e.g., deployed) neural network will have one compression block corresponding to a transition point between on-sensor computation and aggregator device computing, this network may correspond to an actually deployed neural network.

It should be noted that conventional techniques for weight nationalization may lead to training instability and accordingly, sub-optimal training performance. For example, training instability may arise due to gradients associated with a compression block being substantially larger (e.g., five times larger, ten times larger, twenty times larger, etc.) than gradients of other layers. Accordingly, in some implementations, weights may be initialized using a geometric mean of the input and output number of channels for a given layer. For example, given an input number of channels represented by $c_{in}$ and an output number of channels represented by $c_{out}$, weights may be initialized using $$\frac{2}{k^2 \sqrt{c_{in} * c_{out}}}.$$

At 508, process 500 can determine whether training of the candidate neural networks is complete. For example, process 500 can determine whether more than a predetermined threshold number (e.g., fifty, one hundred, five hundred, one thousand, etc.) of training iterations have been completed. As another example, process 500 can determine training has been completed responsive to determining that changes in weights in successive training iterations is less than a predetermined change threshold.

If, at 508, process 500 determines that training of the candidate neural networks has not yet been completed ("no" at 508), process 500 can loop back to block 504 and can identify additional values of the different search dimensions to be used to training another set of candidate neural networks. Conversely, if, at 508, process 500 determines that training of the candidate neural networks has been completed ("yes" at 508), process 500 can end.

FIG. 6 is a flowchart of an example process 600 for selecting a partitioned neural network from a set of candidate neural networks in accordance with some embodiments. It should be noted that process 600 generally corresponds to the second stage of the technique for selecting the partitioned neural network architecture. In some implementations, blocks of process 600 may be executed by one or more server devices. In some embodiments, blocks of process 600 may be executed in an order other than what is shown in FIG. 6. In some implementations, two or more blocks of process 600 may be executed substantially in parallel. In some implementations, one or more blocks of process 600 may be omitted.

Process 600 can begin at 602 by obtaining a set of trained candidate neural networks. For example, in some implementations, the set of trained candidate neural networks may vary in parameters associated with different layers, number of compression blocks, and/or location(s) of compression block(s). In some implementations, the set of trained candidate neural networks may have been configured to span a lower and upper bound of performance. In some embodiments, the set of trained candidate neural networks may be a product of the first stage of a technique for identifying a partitioned neural network. For example, in some embodiments, the set of trained candidate neural networks may be generated using, for example, process 500 as shown in and described above in connection with FIG. 5.

At 604, process 600 can select a trained candidate neural network from the set of trained candidate neural networks. In some implementations, process 600 can select the trained candidate neural network randomly. In some implementations, process 600 can select the trained candidate neural network randomly from within a particular group of trained candidate neural networks. For example, in an instance in which the candidate neural networks were trained with e.g., a first set having all potential parameters and no compression blocks, a second set having all potential parameters and all compression blocks, a third set having a subset of the parameters and all compression blocks, and a fourth set having a random sampling of the potential parameters and one compression block, process 600 can randomly select a candidate neural network from one of the four sets of candidate neural networks.

At 606, process 600 can evaluate the selected candidate neural network based on prediction accuracy and hardware usage constraints. For example, in some implementations, the selected candidate neural network can be evaluated based on performance with the training images of the training set used to train the selected candidate neural network and/or based on performance with images in a validation set. The selected candidate neural network may be evaluated based on hardware usage constraints, such as a latency or bandwidth required to transmit feature tensor information from one or more on-sensor computing devices to an on-aggregator computing device (e.g., given the compression block of the selected candidate neural network), peak memory usage of the on-sensor computing devices during execution of the on-sensor layers of the selected candidate neural network, and/or any combination thereof.

At 608, process 600 can optionally generate one or more new candidate neural networks based on the evaluation. For example, in some implementations, one or more child candidate neural networks may be generated based on characteristics of the selected candidate neural network using any suitable genetic algorithm. As a more particular example, one or more child candidate neural networks may be generated that have a subset of characteristics (e.g., the same layer parameters or dimensions, compression block in the same location, and/or any other suitable characteristics) that are the same as those of the selected candidate neural network. In some implementations, characteristics of two candidate neural networks may be crossed to construct a child candidate neural network. In some implementations, block 608 may be implemented responsive to the selected candidate neural network exceeding a minimum prediction accuracy and/or satisfying minimum hardware usage constraints. For example, in some implementations, child candidate neural networks may be generated based on characteristics of two or more top-performing parent candidate neural networks. In other words, in some implementations, child candidate neural networks may be constructed that copy at least a subset of characteristics of one or more parent candidate neural networks responsive to the one or more parent candidate neural networks exceeding minimum criteria. It should be noted that, in some implementations, a genetic algorithm used to generate child candidate neural networks from parent candidate neural networks may employ mutation to modify characteristics of a parent candidate neural network (e.g., number of dimensions of a particular layer, location of a compression block, etc.) prior to crossing over characteristics to generate the child candidate neural network. In some implementations, the one or more new candidate neural networks may be added to the set of trained candidate neural networks to be evaluated. In some implementations, the one or more new candidate neural networks may be evaluated after generation.

At 610, process 600 can determine whether evaluation of the set of trained candidate neural networks, inclusive of any newly generated candidate neural networks, has been completed. In some implementations, process 600 can determine that evaluation is done responsive to determining that a candidate neural network that satisfies a predetermined prediction accuracy and a predetermined hardware usage constraint has been identified. In some implementations, process 600 can determine that evaluation is done responsive to determining that more than a predetermined number of candidate neural networks have been evaluated (e.g., more than 10%, more than 50%, more than 70%, all, etc.).

If, at 610, process 600 determines that evaluation is not yet done ("no" at 610), process 600 can loop back to block 604 and select another trained candidate neural network to evaluate. Conversely, if, at 610, process 600 determines that evaluation is done ("yes" at 610), process 600 can proceed to 612 and select a given candidate neural network to be the partitioned neural network to be used based on the evaluation. For example, process 600 can select the candidate neural network as the optimal candidate network, wherein the optimum is determined based on a combination of prediction accuracy and hardware usage. As a more particular example, in some implementations, process 600 can select the candidate neural network as the one that provides the highest accuracy while satisfying some minimum hardware usage constraint. As another more particular example, in some implementations, process 600 can select the candidate neural network as the one that has minimum hardware usage while satisfying a threshold accuracy constraint.

In some implementations, after selecting the partitioned neural network to be used, process 600 can cause the partitioned neural network to be provided to one or more on-sensor computing devices and on-aggregator devices. For example, process 600 can transmit final weights associated with the trained partitioned neural network such that weights associated with layers prior to the compression block are transmitted to the one or more on-sensor computing devices and weights associated with layers after the compression block are transmitted to the on-aggregator computing device.

Figure 7:
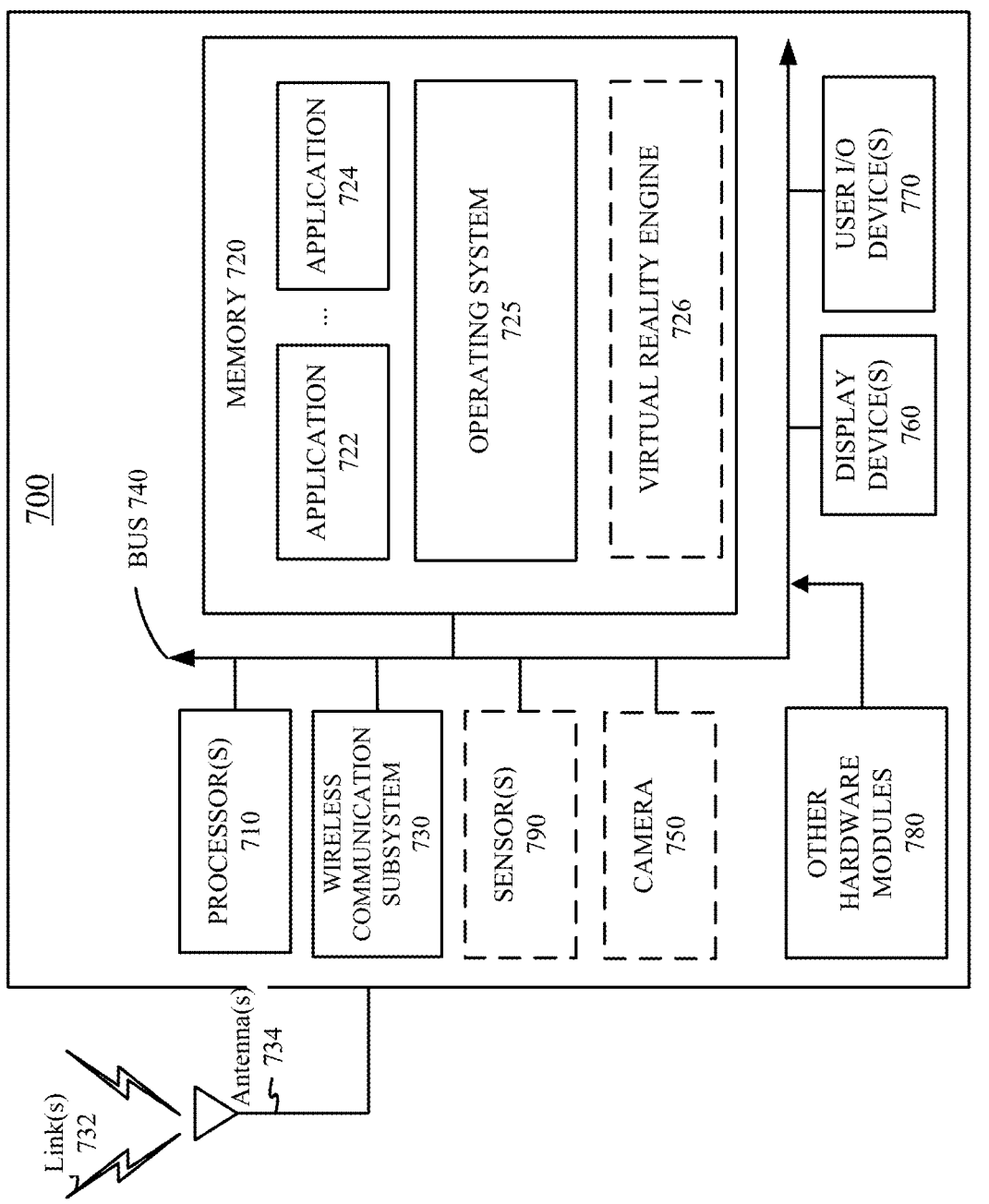
FIG. 7 is a simplified block diagram of an example of a computing system that may be implemented as part of a mobile device, wearable device, and/or a user device according to certain embodiments.

FIG. 7 is a simplified block diagram of an example of a computing system 700 for implementing some of the examples described herein. For example, in some embodiments, computing system 700 may be used to implement one or more user devices (e.g., a mobile device and/or a wearable computer, such as a AR/VR headset) that implements a partitioned neural network at inference time. In the illustrated example, computing system 700 may include one or more processor(s) 710 and a memory 720. Processor(s) 710 may be configured to execute instructions for performing operations at a number of components, and can be, for example, a general-purpose processor or microprocessor suitable for implementation within a portable electronic device. Processor(s) 710 may be communicatively coupled with a plurality of components within computing system 700. To realize this communicative coupling, processor(s) 710 may communicate with the other illustrated components across a bus 740. Bus 740 may be any subsystem adapted to transfer data within computing system 700. Bus 740 may include a plurality of computer buses and additional circuitry to transfer data.

Memory 720 may be coupled to processor(s) 710. In some embodiments, memory 720 may offer both short-term and long-term storage and may be divided into several units. Memory 720 may be volatile, such as static random access memory (SRAM) and/or dynamic random access memory (DRAM) and/or non-volatile, such as read-only memory (ROM), flash memory, and the like. Furthermore, memory 720 may include removable storage devices, such as secure digital (SD) cards. Memory 720 may provide storage of computer-readable instructions, data structures, program modules, and other data for computing system 700. In some embodiments, memory 720 may be distributed into different hardware modules. A set of instructions and/or code might be stored on memory 720. The instructions might take the form of executable code that may be executable by computing system 700, and/or might take the form of source and/or installable code, which, upon compilation and/or installation on computing system 700 (e.g., using any of a variety of generally available compilers, installation programs, compression/decompression utilities, etc.), may take the form of executable code.

In some embodiments, memory 720 may store a plurality of application modules 722 through 724, which may include any number of applications. Examples of applications may include gaming applications, conferencing applications, video playback applications, or other suitable applications. The applications may include a depth sensing function or eye tracking function. Application modules 722-724 may include particular instructions to be executed by processor(s) 710. In some embodiments, certain applications or parts of application modules 722-724 may be executable by other hardware modules 780. In certain embodiments, memory 720 may additionally include secure memory, which may include additional security controls to prevent copying or other unauthorized access to secure information.

In some embodiments, memory 720 may include an operating system 725 loaded therein. Operating system 725 may be operable to initiate the execution of the instructions provided by application modules 722-724 and/or manage other hardware modules 780 as well as interfaces with a wireless communication subsystem 730 which may include one or more wireless transceivers. Operating system 725 may be adapted to perform other operations across the components of computing system 700 including threading, resource management, data storage control and other similar functionality.

Wireless communication subsystem 730 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Computing system 700 may include one or more antennas 734 for wireless communication as part of wireless communication subsystem 730 or as a separate component coupled to any portion of the system. Depending on desired functionality, wireless communication subsystem 730 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.6x, or some other types of network. The techniques described herein may also be used for any combination of WWAN, WLAN, and/or WPAN. Wireless communications subsystem 730 may permit data to be exchanged with a network, other computer systems, and/or any other devices described herein. Wireless communication subsystem 730 may include a means for transmitting or receiving data, such as identifiers of HMD devices, position data, a geographic map, a heat map, photos, or videos, using antenna(s) 734 and wireless link(s) 732. Wireless communication subsystem 730, processor(s) 710, and memory 720 may together comprise at least a part of one or more of a means for performing some functions disclosed herein.

Embodiments of computing system 700 may also include one or more sensors 790. Sensor(s) 790 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 790 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Computing system 700 may include a display module 760. Display module 760 may be a near-eye display, and may graphically present information, such as images, videos, and various instructions, from computing system 700 to a user. Such information may be derived from one or more application modules 722-724, virtual reality engine 726, one or more other hardware modules 780, a combination thereof, or any other suitable means for resolving graphical content for the user (e.g., by operating system 725). Display module 760 may use liquid crystal display (LCD) technology, light-emitting diode (LED) technology (including, for example, OLED, ILED, μLED, AMOLED, TOLED, etc.), light emitting polymer display (LPD) technology, or some other display technology.

Computing system 700 may include a user input/output module 770. User input/output module 770 may allow a user to send action requests to computing system 700. An action request may be a request to perform a particular action. For example, an action request may be to start or end an application or to perform a particular action within the application. User input/output module 770 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to computing system 700. In some embodiments, user input/output module 770 may provide haptic feedback to the user in accordance with instructions received from computing system 700. For example, the haptic feedback may be provided when an action request is received or has been performed.

Computing system 700 may include a camera 750 that may be used to take photos or videos of a user, for example, for tracking the user's eye position. Camera 750 may also be used to take photos or videos of the environment, for example, for VR, AR, or MR applications. Camera 750 may include, for example, a complementary metal-oxide-semiconductor (CMOS) image sensor with a few millions or tens of millions of pixels. In some implementations, camera 750 may include two or more cameras that may be used to capture 3-D images.

In some embodiments, computing system 700 may include a plurality of other hardware modules 780. Each of other hardware modules 780 may be a physical module within computing system 700. While each of other hardware modules 780 may be permanently configured as a structure, some of other hardware modules 780 may be temporarily configured to perform specific functions or temporarily activated. Examples of other hardware modules 780 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 780 may be implemented in software.

In some embodiments, memory 720 of computing system 700 may also store a virtual reality engine 726. Virtual reality engine 726 may execute applications within computing system 700 and receive position information, acceleration information, velocity information, predicted future positions, or some combination thereof of the HMD device from the various sensors. In some embodiments, the information received by virtual reality engine 726 may be used for producing a signal (e.g., display instructions) to display module 760. For example, if the received information indicates that the user has looked to the left, virtual reality engine 726 may generate content for the HMD device that mirrors the user's movement in a virtual environment. Additionally, virtual reality engine 726 may perform an action within an application in response to an action request received from user input/output module 770 and provide feedback to the user. The provided feedback may be visual, audible, or haptic feedback. In some implementations, processor(s) 710 may include one or more GPUs that may execute virtual reality engine 726.

In various implementations, the above-described hardware and modules may be implemented on a single device or on multiple devices that can communicate with one another using wired or wireless connections. For example, in some implementations, some components or modules, such as GPUs, virtual reality engine 726, and applications (e.g., tracking application), may be implemented on a console separate from the head-mounted display device. In some implementations, one console may be connected to or support more than one MD.

In alternative configurations, different and/or additional components may be included in computing system 700. Similarly, functionality of one or more of the components can be distributed among the components in a manner different from the manner described above. For example, in some embodiments, computing system 700 may be modified to include other system environments, such as an AR system environment and/or an MR environment.

Figure 8:
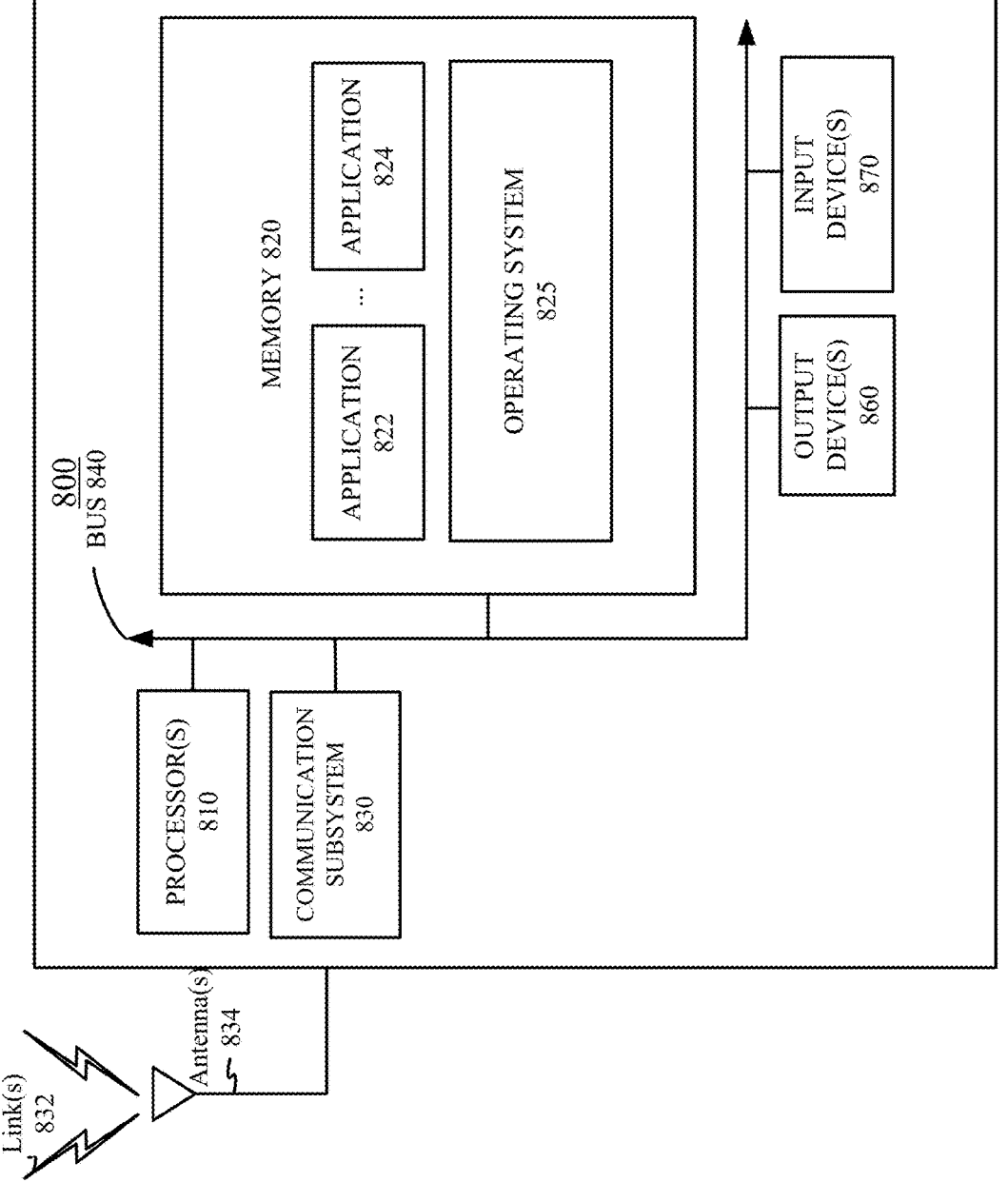
FIG. 8 is a simplified block diagram of an example of a computing system that may be implemented as part of a server according to certain embodiments.

FIG. 8 is a simplified block diagram of an example of a computing system 800 that may be implemented in connection with a server in accordance with some embodiments. For example, computing system 800 may be used to implement a server that trains a set of candidate neural networks and/or selects a candidate neural network, as shown in and described above in connection with FIGS. 4-6.

In the illustrated example, computing system 800 may include one or more processor(s) 810 and a memory 820. Processor(s) 810 may be configured to execute instructions for performing operations at a number of components, and can be, for example, a general-purpose processor or microprocessor suitable for implementation within a portable electronic device. Processor(s) 810 may be communicatively coupled with a plurality of components within computing system 800. To realize this communicative coupling, processor(s) 810 may communicate with the other illustrated components across a bus 840. Bus 840 may be any subsystem adapted to transfer data within computing system 800. Bus 840 may include a plurality of computer buses and additional circuitry to transfer data. In some embodiments, processor(s) 810 may be configured to perform one or more blocks of any of processes 400, 500, and/or 600, as shown in and described above in connection with FIGS. 4-6, respectively.

Memory 820 may be coupled to processor(s) 810. In some embodiments, memory 820 may offer both short-term and long-term storage and may be divided into several units. Memory 820 may be volatile, such as static random access memory (SRAM) and/or dynamic random access memory (DRAM) and/or non-volatile, such as read-only memory (ROM), flash memory, and the like. Furthermore, memory 820 may include removable storage devices, such as secure digital (SD) cards. Memory 820 may provide storage of computer-readable instructions, data structures, program modules, and other data for computing system 800. In some embodiments, memory 820 may be distributed into different hardware modules. A set of instructions and/or code might be stored on memory 820. The instructions might take the form of executable code that may be executable by computing system 800, and/or might take the form of source and/or installable code, which, upon compilation and/or installation on computing system 800 (e.g., using any of a variety of generally available compilers, installation programs, compression/decompression utilities, etc.), may take the form of executable code.

In some embodiments, memory 820 may store a plurality of application modules 822 through 824, which may include any number of applications. Examples of applications may include gaming applications, conferencing applications, video playback applications, or other suitable applications. Application modules 822-824 may include particular instructions to be executed by processor(s) 810. In some embodiments, certain applications or parts of application modules 822-824 may be executable by other hardware modules. In certain embodiments, memory 820 may additionally include secure memory, which may include additional security controls to prevent copying or other unauthorized access to secure information.

In some embodiments, memory 820 may include an operating system 825 loaded therein. Operating system 825 may be operable to initiate the execution of the instructions provided by application modules 822-824 and/or manage other hardware modules as well as interfaces with a wireless communication subsystem 830 which may include one or more wireless transceivers. Operating system 825 may be adapted to perform other operations across the components of computing system 800 including threading, resource management, data storage control and other similar functionality.

Communication subsystem 830 may include, for example, an infrared communication device, a wireless communication device and/or chipset (such as a Bluetooth® device, an IEEE 802.11 device, a Wi-Fi device, a WiMax device, cellular communication facilities, etc.), a wired communication interface, and/or similar communication interfaces. Computing system 800 may include one or more antennas 834 for wireless communication as part of wireless communication subsystem 830 or as a separate component coupled to any portion of the system. Depending on desired functionality, communication subsystem 830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.7x, or some other types of network. The techniques described herein may also be used for any combination of WWAN, WLAN, and/or WPAN. Communications subsystem 730 may permit data to be exchanged with a network, other computer systems, and/or any other devices described herein. Communication subsystem 830 may include a means for transmitting or receiving data, using antenna(s) 834, wireless link(s) 832, or a wired link. Communication subsystem 830, processor(s) 810, and memory 820 may together comprise at least a part of one or more of a means for performing some functions disclosed herein.

In some embodiments, computing system 800 may include one or more output device(s) 860 and/or one or more input device(s) 870. Output device(s) 870 and/or input device(s) 870 may be used to provide output information and/or receive input information.

The systems, methods, and techniques described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using an LED-based display subsystem.

In some embodiments, the techniques described herein may be integrated into an HMD. For example, such an HMD may include one or more light emitters and/or one or more light sensors incorporated into a portion of a frame of the HMD such that light can be emitted toward a tissue of a wearer of the HMD that is proximate to or touching the portion of the frame of the HMD. Example locations of such a portion of a frame of an HMD may include a portion configured to be proximate to an ear of the wearer (e.g., proximate to a superior tragus, proximate to a superior auricular, proximate to a posterior auricular, proximate to an inferior auricular, or the like), proximate to a forehead of the wearer, or the like. It should be noted that multiple sets of light emitters and light sensors may be incorporated into a frame of an HMD such that PPG can be determined from measurements associated with multiple body locations of a wearer of the HMD.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense.

In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method of partitioning neural networks, comprising:
   obtaining a training set, wherein the training set comprises a set of input training images and corresponding target outputs;
   training a plurality of neural networks, each neural network of the plurality of neural networks trained using the training set, and wherein neural networks of the plurality of neural networks differ based at least in part on dimensions of one or more layers of the neural networks and a location of a compression block positioned between a first set of layers of a neural network and a second set of layers of the neural network; and
   selecting a neural network of the plurality of trained neural networks based on performance of the plurality of neural networks with respect to the training set and hardware constraints of a system on which the neural network is to be implemented, wherein the first set of layers of the selected neural network are executed by sensor computing devices of one or more sensor devices of the system, and wherein the second set of layers of the selected neural network are executed by an aggregator computing device of the system.

2. The method of claim 1, wherein training the plurality of neural networks comprises, for each iteration of a series of iterations, training a second plurality of neural networks, wherein the second plurality of neural networks comprise: at least one neural network with all potential parameters of a plurality of potential parameters included, at least one neural network with no compression block, at least one neural network with multiple compression blocks, and at least one neural network with a random sampling of the potential parameters.

3. The method of claim 2, wherein the at least one neural network with all potential parameters of the plurality of potential parameters included comprises at least one neural network with no compression blocks.

4. The method of claim 2, wherein the at least one neural network with all potential parameters of the plurality of potential parameters included comprises at least one neural network with multiple compression blocks.

5. The method of claim 2, wherein the at least one neural network with multiple compression blocks comprises a subset of the potential parameters.

6. The method of claim 1, wherein the one or more sensor devices comprise a plurality of sensor devices, and wherein the selected neural network comprises:
   a set of head models, each head model of the set of head models configured to take, as input, sensor data from a sensor of the plurality of sensor devices; and
   a tail model configured to generate a final output, wherein the tail model corresponds to the second set of layers, wherein the compression block comprises a fusion block configured to aggregate outputs of the set of head models and provide the aggregated outputs to the tail model.

7. The method of claim 6, wherein the selected neural network is selected based at least in part on a location of the fusion block.

8. The method of claim 1, wherein selecting the neural network comprises:
   (a) randomly sampling the plurality of trained neural networks to identify a subset of the plurality of trained neural networks;
   (b) evaluating the subset of the plurality of trained neural networks based on the performance of the subset of the plurality of trained neural networks and the hardware constraints of the system;
   (c) generating a second plurality of neural networks based at least in part on the evaluation of the subset of the plurality of trained neural networks; and
   (d) repeating (a)-(c) until the neural network has been identified.

9. The method of claim 8, wherein the second plurality of neural networks comprises a portion of the subset of the plurality of trained neural networks selected based on the evaluation of the subset of the plurality of trained neural networks.

10. The method of claim 8, wherein the second plurality of neural networks comprises at least one neural network of the plurality of trained neural networks not included in the subset of the plurality of trained neural networks.

11. The method of claim 8, wherein the random sampling in (a) comprises a random sampling of a first generation of the plurality of trained neural networks to identify the subset of the plurality of neural networks, and wherein (c) generating the second plurality of neural networks comprises generating the second plurality of neural networks using random sampling, mutation, and crossover from top-performers of the randomly sampled first generation of the plurality of trained neural networks identified in the evaluation in (b).

12. The method of claim 1, wherein the hardware constraints of the system comprise a communication latency to transmit feature information generated from the first set of layers on the one or more sensor devices to the second set of layers on the aggregator computing device.

13. The method of claim 1, wherein the hardware constraints of the system comprise memory usage, bandwidth, or any combination thereof.

14. The method of claim 1, wherein at least one neural network of the plurality of neural networks comprises at least 100 layers.

15. The method of claim 1, wherein the compression block comprises a compression that reduces feature dimensions generated by the first set of layers and an expansion that increases the feature dimensions prior to providing features to the second set of layers.

16. A system, comprising:
   a sensor associated with a sensor computing device; and
   an aggregator computing device,
   wherein:
      the sensor computing device is configured to implement a first set of layers of a neural network, and wherein the aggregator computing device is configured to implement a second set of layers of a neural network, and wherein there is a compression block between the first set of layers and the second set of layers that reduces a feature dimension size of a feature set generated by the first set of layers prior to providing the feature set to the second set of layers, and
      the neural network was selected from a plurality of neural networks based at least in part on an effect of a location of the compression block with respect to the first set of layers and the second set of layers on hardware usage of the sensor computing device and the aggregator computing device.

17. The system of claim 16, wherein the sensor comprises a camera.

18. The system of claim 16, wherein the system comprises a plurality of sensors including the sensor, each associated with a sensor computing device, and wherein the compression block occurs subsequent to a fusion layer that combines feature sets associated with each sensor of the plurality of sensors.

19. The system of claim 16, wherein the hardware usage comprises a communication latency to transmit the feature set from the sensor computing device to the aggregator computing device.

20. The system of claim 16, wherein the hardware usage comprises memory usage, bandwidth, or any combination thereof of the sensor computing device and/or the aggregator computing device.

\* \* \* \* \*